United States Patent [19]

Kuiper

[11] Patent Number: 4,535,933

[45] Date of Patent: Aug. 20, 1985

[54] VEHICLE WITH TILTABLE SIDE WALLS

[75] Inventor: Johnny Kuiper, Nieuwegein, Netherlands

[73] Assignee: Foolish Fantasies B.V., Nieuwegein, Netherlands

[21] Appl. No.: 636,983

[22] Filed: Aug. 2, 1984

[30] Foreign Application Priority Data

Aug. 5, 1983 [NL] Netherlands .......................... 8302783

[51] Int. Cl.³ .............................................. B60H 1/02
[52] U.S. Cl. ................................ 237/12.3 A; 98/2.15; 296/22; 296/24 A; 296/181
[58] Field of Search ............... 296/22, 24 A, 100, 162, 296/181, 216; 98/2, 2.15, 2.14; 237/12.3 A

[56] References Cited

U.S. PATENT DOCUMENTS

| 2,153,147 | 4/1939 | Lintern | 98/2.15 |
| 2,797,124 | 6/1957 | Hauptli | 296/181 |
| 3,741,606 | 6/1973 | Grier | 296/24 A |
| 3,756,650 | 9/1973 | Michel | 296/100 |
| 3,986,749 | 10/1976 | Hull et al. | 296/100 |
| 4,067,603 | 1/1978 | Fenton | 296/100 |

Primary Examiner—Ronald C. Capossela

[57] ABSTRACT

Vehicle comprising side walls pivotable to the floor of the vehicle and a roof pivotable to a side wall, and supports extending near the roof within the space enclosed by the side walls for supporting part of an unspanned roofing made from pliable material and fastened to the free edges of the side walls and the roof, whereas the space covered by said roofing can be inflated to form an air hall.

9 Claims, 5 Drawing Figures

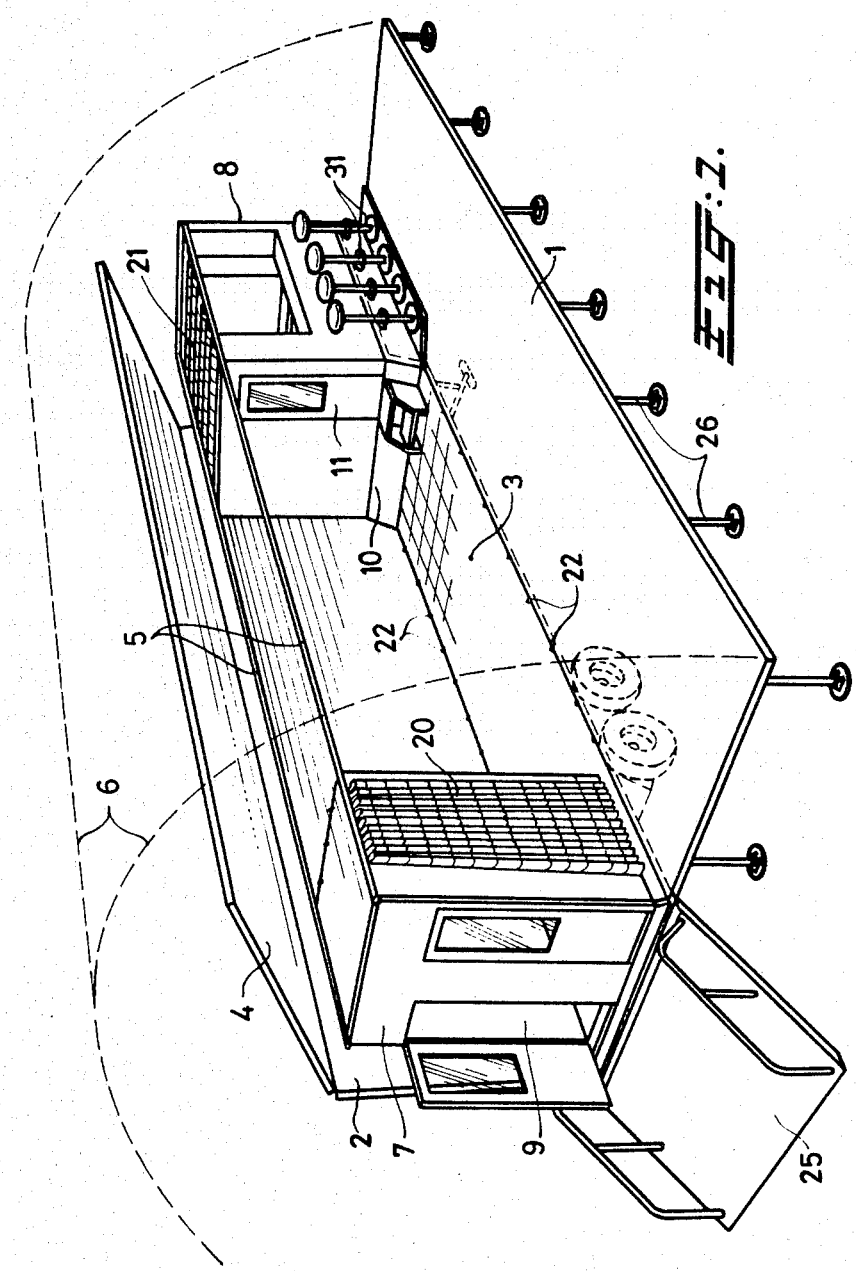

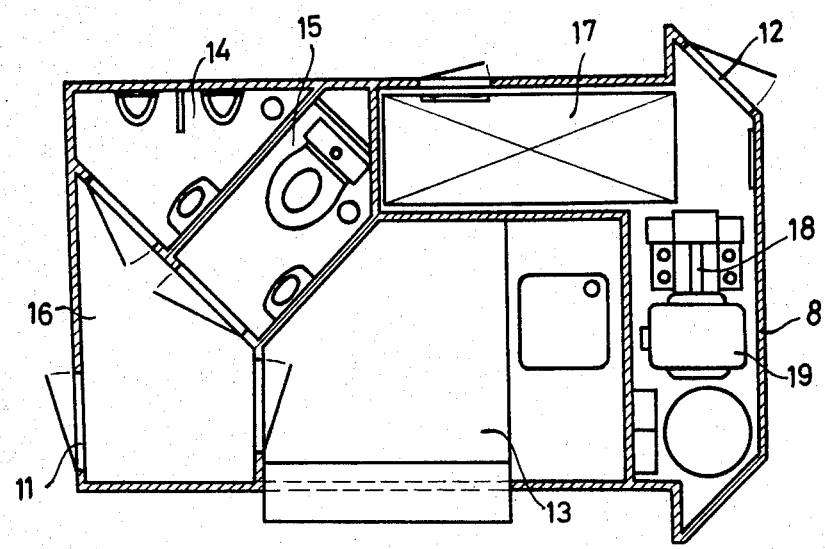
FIG:2.
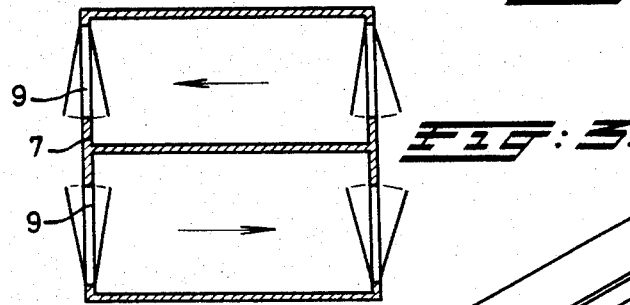
FIG:3.
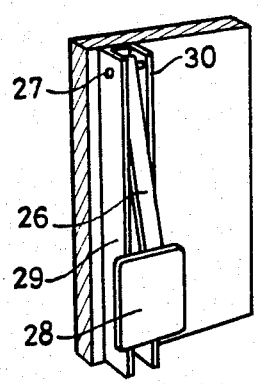
FIG:5.
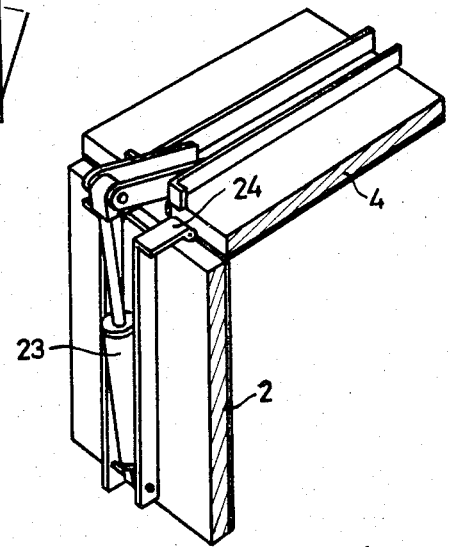
FIG:4.

VEHICLE WITH TILTABLE SIDE WALLS

BACKGROUND OF THE INVENTION

This invention relates to a vehicle comprising side walls entirely or partly pivotable with respect to the floor of the vehicle or to the frame of the vehicle supporting said floor and further comprising a roof being pivotable with respect to a side wall or part of same.

Vehicles of this kind are commonly known; their tiltable side walls are used as floor, for instance, at fair vehicles, as a bottom for a roundabout or the like and also for camping caravans, in which cases a roof is also pivotably fastened to a side wall. Subsequently, a tent is stretched over the whole, thus providing a closed space having dimensions which are considerably greater than those of vehicles ready for running.

A frequent use is made at present of many possibilities to temporary exhibit products and/or services in the neighbourhood of possible potential customers.

The use of buses, trains, lorries, boats and dismountable halls or tents is well known. These systems are however uneconomic; buses and trucks due to the price per square meter, trains and boats because of their non-optimal mobility and the price per square meter, while dismountable halls or tents are also uneconomic due to their complex organisation, loss of time and expensive labour time.

SUMMARY OF THE INVENTION

It is a main object of the present invention to provide a mobile exhibition unit, by means of which it is possible to exhibit a product and/or service at reasonable costs, which unit can easily and quickly be mounted and afterwards again be prepared for transport to another place.

According to the invention this is attained with a vehicle in which supports have been provided extending near the roof and within the space enclosed by the side walls and roof for supporting a part of an unspanned roofing made from pliable material. Due to this feature it is possible to collect the exhibition attributes on the floor of the vehicle, without the possibility of damaging them by the folded roofing or the roofing getting stuck behind these attributes during unfolding of the vehicle. When as vehicle a trailer with chassis of low floorheight or a so-called trailer in the form of a semi-deeploader is used, having a length of, for instance, 13.20 meters, a width of 2.50 meters and a height of 3.10 meters, a useful floorspace of e.g. 13.20 meters × 11 meters can be obtained. The vehicle according to the invention thus has an elongated model and upstanding means provided at the front- and rear ends between which supports in the form of rods or beams are arranged. These fixed upstanding means form end walls of the vehicle, at least one end wall having a closable passage to the inside of the vehicle.

In a practical embodiment of the vehicle according to the invention, at least one of the end walls has been designed as a vestibule or air sluice.

It is also possible to provide at least one of the end walls with a space which is equipped as service center and comprising a passage to the remaining part above the vehicle floor. Preferably the service center is divided into two parts, of which one part is provided with a passage to the space above the vehicle floor and is equipped for personal attendance, the other part having a passage to outside the vehicle being equipped as engine room. One or more driven blowers can be installed in this space for inflating the space under the roofing of pliable material, affixed along the free edges of the side walls and the roof and along the upstanding means. After inflating the space covered by said roofing the exhibition room will obtain the shape of an air hall.

SURVEY OF THE DRAWINGS

FIG. 1 shows a perspective view of a vehicle in the form of a trailer with one side wall in a completely tilted down position, and another side wall with roof in only slightly tilted, open position;

FIG. 2 shows a horizontal section through the upstanding means formed as a space equipped as service center;

FIG. 3 shows a horizontal section of upstanding means, equipped as air sluice;

FIG. 4 shows a perspective view of part of a side wall with roof at the location of a pivotable construction; and FIG. 5 shows a view of a tiltable support of a side wall.

DESCRIPTION OF THE PREFERRED EMBODIMENTS

As shown in FIG. 1 the vehicle according to the invention in the form of a trailer, comprises side walls 1 and 2 which are pivotably attached to the vehicle floor 3 or to the vehicle frame supporting this floor. The roof 4 is pivotably attached to the side wall 2. However, it is also possible to split up the vehicle roof lengthwise into two halves one half being attached to the edge of the side wall 1, the other half being pivotably attached to the edge of the side wall 2.

In the space enclosed by the side walls 1 and 2 and the roof 4, supports 5 are situated near the roof, for the purpose of supporting part of a roofing made of a pliable material in unspanned condition. The roofing (not shown) is indicated in general, in spanned condition, by the dotted lines 6. The vehicle of an elongated model comprises at the front- and rear ends fixed upstanding means 7 and 8, between which the supports 5 in the form of rods or beams are situated. The fixed upstanding means 7 and 8 form end walls of the vehicle and the supports 5 are running near the corners between the roof and the side walls, from one end wall 7 to the other end wall 8. At least one end wall 7 has a closable passage 8 to the inside of the vehicle. At least one of the end walls (in FIG. 1 the end wall 7), is constructed as a cell and destined as a vestibule or air sluice, (see the horizontal section in FIG. 3). In this embodiment the air sluice is a dual one and forms an entrance and a way out, each part having an outer door and an inner door. It is also possible to design the air sluice as a single one and to provide it with a revolving door or with two doors sliding through the corners of the cell (so-called Finnish doors) so providing a large passage.

As the vehicle is constructed as trailer, the front part 10 of the floor 3 has been raised in order to be able to put it on top of a sliding plate on the rear part of a trucking vehicle, as is usual with trailers. The end wall 8 in this embodiment is also constructed as a cell and is equipped as a service center with a passage 11 to the space above the remaining part above the vehicle floor 3. This service center (shown in FIG. 2 in horizontal section) is split up into two parts, one part provided with a passage 11 to the space above the vehicle floor being equipped for personal attendance, the other part provided with a passage 12 to outside the vehicle, being equipped as engine room. The part which has been equipped for personal attendance may, for instance, contain a kitchen 13, a lavatory 14 and 15, and a small portal 16. The part equipped as engine room may, for instance, comprise a unit 17, with ventilator blowers and air conditioning means and also channel systems with guide vanes for controlling currents of air.

The engine room further contains a motor-(18)driven generator for generating electric energy. This generator can be placed outside the vehicle and be electrically connected to the installation of the vehicle, so that the noise of the motor 18 will not disturb visitors within the vehicle. Along the free edges of the side walls, the roof and the upstanding means 7 and 8, edges of the roofing made of pliable material have been attached. This roofing needs no further description as it is known in general in the form of air halls. The space under the roofing is then inflated by means of one or more driven ventilator blowers for spanning the roofing, which can reach a height of e.g. 6 meters, so that there is sufficient air volume available for placing objects in the space between the floor, formed out of the side walls 2 and 1, the floor 3 and the roofing 4, thus in the air hall which has come into existence, and for the accommodation of a great number of persons. Preferably a main blower is adapted for inflating the space under the roofing, while an auxiliary ventilator is available in case that the main blower might get out of order. Besides fresh air the ventilator can also suck air out of the spanned room. Due to this feature the air, for instance, can be heated in winter, while for respiration also sufficient air will be supplied. The fresh air supply to the ventilator can be interrupted the capacity of the ventilator being sufficient for exhaustion of air out of the room spanned by the roofing. This is of advantage when folding the roofing together, when the side walls and the roofing are being brought together into the closing position of the vehicle. Before taking steps to do so the exhibited objects are removed from those floor areas formed by the side walls 1 and 2, placed on the vehicle floor 3 and mounted swinging-tight.

The supports 5 are formed by rails for spanning curtains, more specifically nets or meshcurtains 20 and 21. At each side of the vehicle floor 3, such a curtain 20 is present which can close the room between the upstanding means 7 and 8 at either side. The underhems of the curtains 20 can be hooked in sunk eyes 22 fitted in the vehicle floor 3. The curtain 21 can be pushed between the supports 5 in the direction of the upstanding means 7, so completely closing the inner room above the vehicle floor. The advantage of this feature is, that when tilting upwards the side walls 1 and 2 and the roof and further exhausting the room, the roofing will fold itself together and the material of the roofing cannot come into contact with the attributes placed on the vehicle floor 3. The electric current generated by the generator 19 is required for the ventilators and as consumptive current for electric devices and lighting. Furthermore a hydraulic pump is present (not shown) for operating double-acting hydraulic cylinder-piston systems for tilting the side walls and the roof. FIG. 4 shows a cylinder-piston system 23 fitted at a pivot 24 between the side wall 2 and the roof 4. A number of these cylinder-piston systems and a number of these pivots 24 are fitted lengthwise of the side wall and the roof. Similar constructions are also fitted at the vehicle floor 3, the side walls 1 and 2, and also at a liftable tail board 25, intended as an entrance to the interior of the vehicle.

The side walls 1 and 2 and also the roof 4 have to be supported for which purpose legs 26 are present, which clap out automatically when the side walls 1 and 2 and also the roof 4 come near the ground. For this purpose the legs 26 are pivotable at 27 while the swinging out legs are provided at their free ends with a pivotable sole plate 28. By imparting a certain unbalance to the legs, for instance, by means of a weight, they can move between a position of more than 90°, rendering it impossible to the legs 26 to clap back. A stop 30 can prevent a further clapping out of the legs.

Due to the fact that the front part 10 of the vehicle floor 3 is positioned at a higher level, open areas are obtained near the side walls 1 and 2, and also under the cell near the upstanding means 8. These open areas can be closed by means of separate partitions 31. In case the cell is situated near the upstanding means 8 (shown in FIG. 2) the side walls of the service room are set back in regard of the side-edges of the floor; the partitions 31 tilted upwards against the side walls of the upstanding means.

In this manner a mobile exhibition hall is obtained, of which the mounting can be done by one or two persons within a period of one hour after the trailer has been parked on the right place.

What is claimed is:

1. A vehicle body comprising an elongated floor having a pair of opposed ends and a pair of opposed sides, fixed upright means at the opposed ends thereof, a pair of side walls pivotably connected to the opposed sides of said floor, a roof member pivotably connected to one of said side walls, said side wall and roof member being pivotable into substantially the plane of said floor to define a floor surface, elongated longitudinal supports between said upright means extending near the roof member and within the space enclosed by said roof member and side walls, and an unspanned roofing of pliable material at least partially supported by said elongated supports to enclose said floor surface.

2. Vehicle according to claim 1, wherein at least one of the end walls is carried out as a cell and adapted as a vestibule or air sluice.

3. Vehicle according to claim 1, wherein at least one of the end walls forms a cell being equipped as service center, with a passage to the space above the remaining part above the vehicle floor.

4. Vehicle according to claim 3, wherein the service center is split up into two parts, of which one part is provided with a passage to the space above the vehicle floor and is equipped for personal attendance, the other part having a passage to outside the vehicle being equipped as engine room.

5. Vehicle according to claim 4, wherein in the part adapted as engine room a motor-driven generator is installed for generating electric current for the ventilator and consumptive current for electric devices and the lighting, which driven generator can be situated outside the vehicle.

6. Vehicle according to claim 1, wherein along the free edges of the side walls, the roof and upstanding means, edges of the roofing made from pliable material are fixed.

7. Vehicle according to claim 6, wherein the space under the roofing is inflatable by means of one or more ventilator blowers for spanning the roofing, said ventilator blowers being able besides sucking in fresh air, to also suck air out of the space spanned by the roofing.

8. Vehicle according to claim 7, wherein the fresh air supply to the ventilator blower can be interrupted, the capacity of the ventilator blower being sufficient for sucking air out of the space spanned by the roofing when folding together said roofing, when the side walls and the roof are brought into the closing position of the vehicle.

9. Vehicle according to claim 1, wherein the supports are adapted as rails for the spanning of curtains, more specifically nets or meshcurtains.

* * * * *